March 22, 1932.  F. K. EASTMAN  1,850,229
DOORCHECK
Filed Oct. 5, 1929
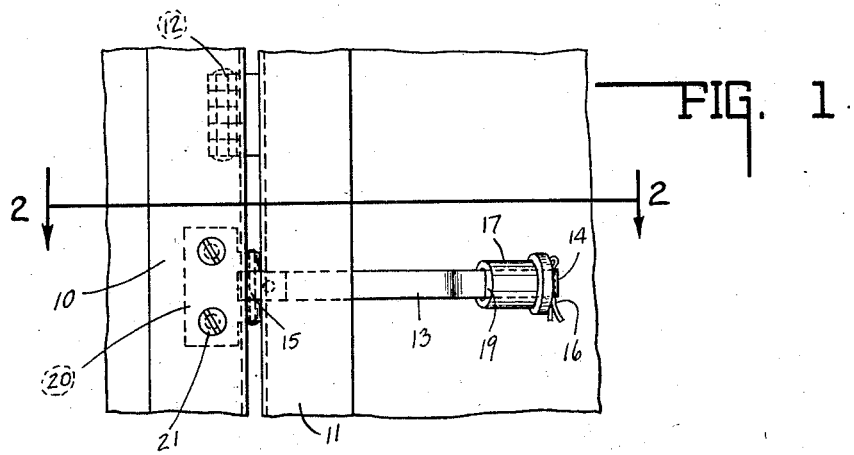
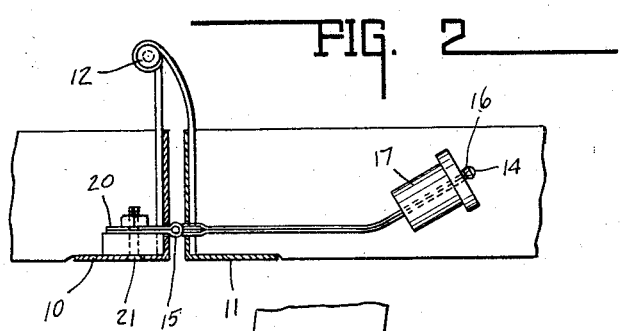
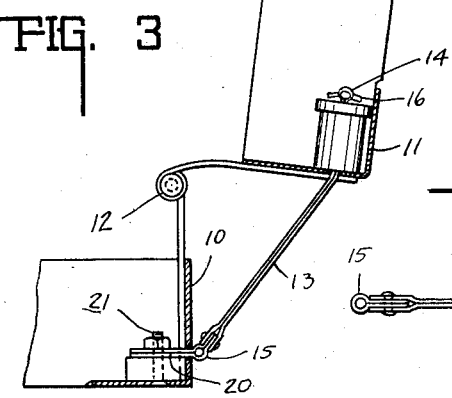
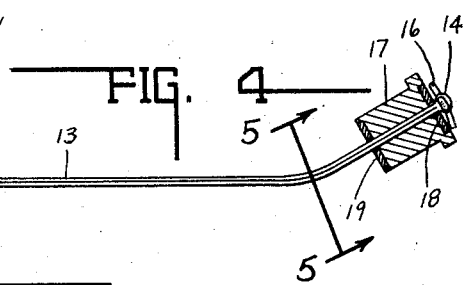
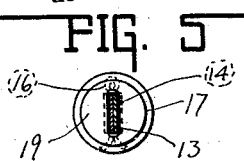
INVENTOR.
FLOYD K. EASTMAN.
BY Lockwood, Lockwood,
Goldsmith & Galt
ATTORNEYS.

Patented Mar. 22, 1932

1,850,229

UNITED STATES PATENT OFFICE

FLOYD K. EASTMAN, OF KOKOMO, INDIANA, ASSIGNOR TO CONCEALED DOOR CHECK COMPANY, OF KOKOMO, INDIANA, A CORPORATION

DOORCHECK

Application filed October 5, 1929. Serial No. 397,646.

This invention relates to a door check particularly adapted for use on automobile bodies for limiting the outward swing of the body door.

The present object of the invention is to provide a door check of simple economical construction which will be concealed when the door is closed and will limit the opening movement of the door while absorbing the shock through a resilient shock absorbing medium.

One feature of the invention resides in the character and construction of the shock absorbing element comprising a rubber bumper protected at one end by a metallic disk imbedded therein and adapted to bear against the enlarged free end of the strap and a second metallic disk imbedded in the other end of the bumper in position to engage and protect the bumper from mutilation upon coming in contact with the door or body pillar.

Another feature of the invention resides in the construction of the strap which is pivotally hinged to an anchor member and slidably extends through an opening in the door or pillar, said strap being formed of thin flexible sheet metal folded upon itself, the folded end being looped to present an enlarged head adapted to receive a pin for retaining the sliding movement of the bumper.

The full nature of the invention will be understood from the accompanying drawings and the following description and claims:

Fig. 1 is a front elevation showing the strap in position with the door closed. Fig. 2 is a section taken on line 2—2 of Fig. 1. Fig. 3 is the same as Fig. 2 showing the door in open position. Fig. 4 is a plan view of the strap. Fig. 5 is a section taken on line 5—5 of Fig. 4.

In the drawings there is illustrated a body pillar 10 of a vehicle and a door pillar 11. Said pillars are shown herein as comprising metal as distinguished from the usual wood pillars, although the door check illustrated is applicable to either type. The door pillar is hinged to the body pillar by the hinge 12.

The door check comprises a strap 13 formed of flexible sheet metal folded upon itself so as to form the folded looped end 14. The free ends of the looped portions of the strap are riveted to the hinge member 15. The folded or looped end 14 is adapted to receive a pin such as the cotter pin 16 shown herein for limiting the movement of the rubber bumper 17 which is slidably mounted upon the strap. Imbedded in each end of the rubber bumper there are annular metal protective plates or disks 18 and 19. The disk 18 protects the bumper from mutilation by contacting with the looped end 14 or pin 16 while the inner protective disk 19 protects the bumper from mutilation upon contacting with the door pillar 11 when the door is swung to its extreme open position.

The hinge member 15 is hingedly secured to the anchor plate 20 which extends through a suitable slot in the body pillar 10 and is secured thereto by the screw bolts 21.

It will be noted from the foregoing that a door check of strong and sturdy construction results from the doubled or laminated form of the strap which is economically made of a thin strip of flexible sheet metal folded upon itself, the folded end forming in itself an enlarged head for limiting the opening movement of the door. The rubber bumper which is slidably mounted on the strap is fully protected at both ends from wear, mutilation or other damage by the metal protective disks, thus providing an effective, long lived and economical shock absorbing element.

The invention claimed is:

1. A door check comprising a thin flexible metal strap folded upon itself to provide two thicknesses thereof and a looped end, means for hingedly anchoring the straps at the free ends thereof, and a rubber bumper slidably mounted thereon and positioned to be limited in its sliding movement in one direction by the enlarged looped end of said strap.

2. A door check comprising a thin flexible metal strap folded upon itself to provide two thicknesses thereof and a looped end, means for anchoring the strap at the free ends thereof, a rubber bumper slidably mounted thereon positioned to be limited in its sliding movement in one direction by the enlarged looped end of said strap, and means associated with said rubber bumper for protecting it from mutilation when engaged between the door to be checked and the enlarged end of said strap.

3. A door check comprising a thin flexible metal strap folded upon itself to provide two thicknesses thereof and a looped end, means for anchoring the strap at the free ends thereof, a rubber bumper slidably mounted thereon positioned to be limited in its sliding movement in one direction by the enlarged looped end of said strap, and a pair of metallic plates associated with each end of said bumper in position to engage and be engaged by the enlarged looped end of the strap and the door to be checked respectively whereby said bumper will be protected from mutilation.

4. A door check comprising a thin flexible metal strap folded upon itself to provide two thicknesses thereof and a looped end, means for anchoring the strap at the free ends thereof, a rubber bumper slidably mounted thereon positioned to be limited in its sliding movement in one direction by the enlarged looped end of said strap, and a metallic disk imbedded in each end of the rubber bumper for protecting it against mutilation, said disks being of less diameter than the diameter of that portion of the bumper in which they are imbedded for preventing engagement of the edges of said disks with the door to be checked.

5. A door check construction comprising a flat metal strap having a loop in one end thereof; means for anchoring the other end of said strap; a rubber bumper supported upon said strap adjacent the looped end thereof; and means imbedded in said rubber bumper for protecting the latter from mutilation when brought into engagement with the member to be checked.

6. A door check comprising a flat strip of material; means for anchoring the strap at one end thereof; a bumper of resilient mounted material adjacent the other end of said strap; and metallic protective means imbedded in each end of said bumper.

7. A door check comprising a metal strap; means for anchoring the strap at one end thereof, the other end of said strap having a looped portion; a rubber bumper mounted upon said strap at the looped end thereof; and a retaining pin in said loop for limiting the movement of said bumper.

In witness whereof, I have hereunto affixed my signature.

FLOYD K. EASTMAN.